E. H. HIPPLE.
CANE PLANTER.
APPLICATION FILED JUNE 25, 1919.
1,386,407.
Patented Aug. 2, 1921.
3 SHEETS—SHEET 2.
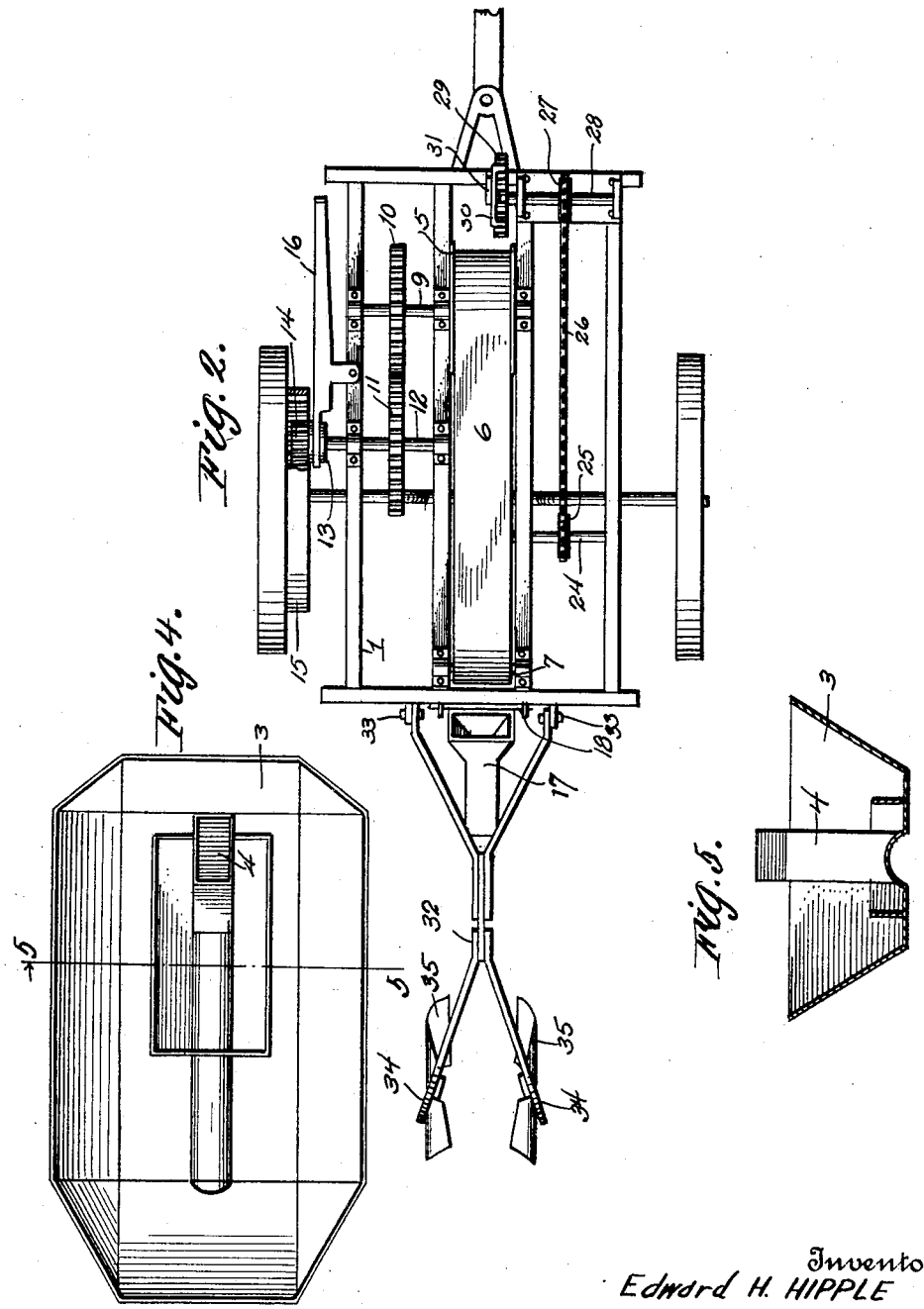
WITNESSES
Guy M. Spring
Inventor
Edward H. HIPPLE
By Richard B Owen
Attorney

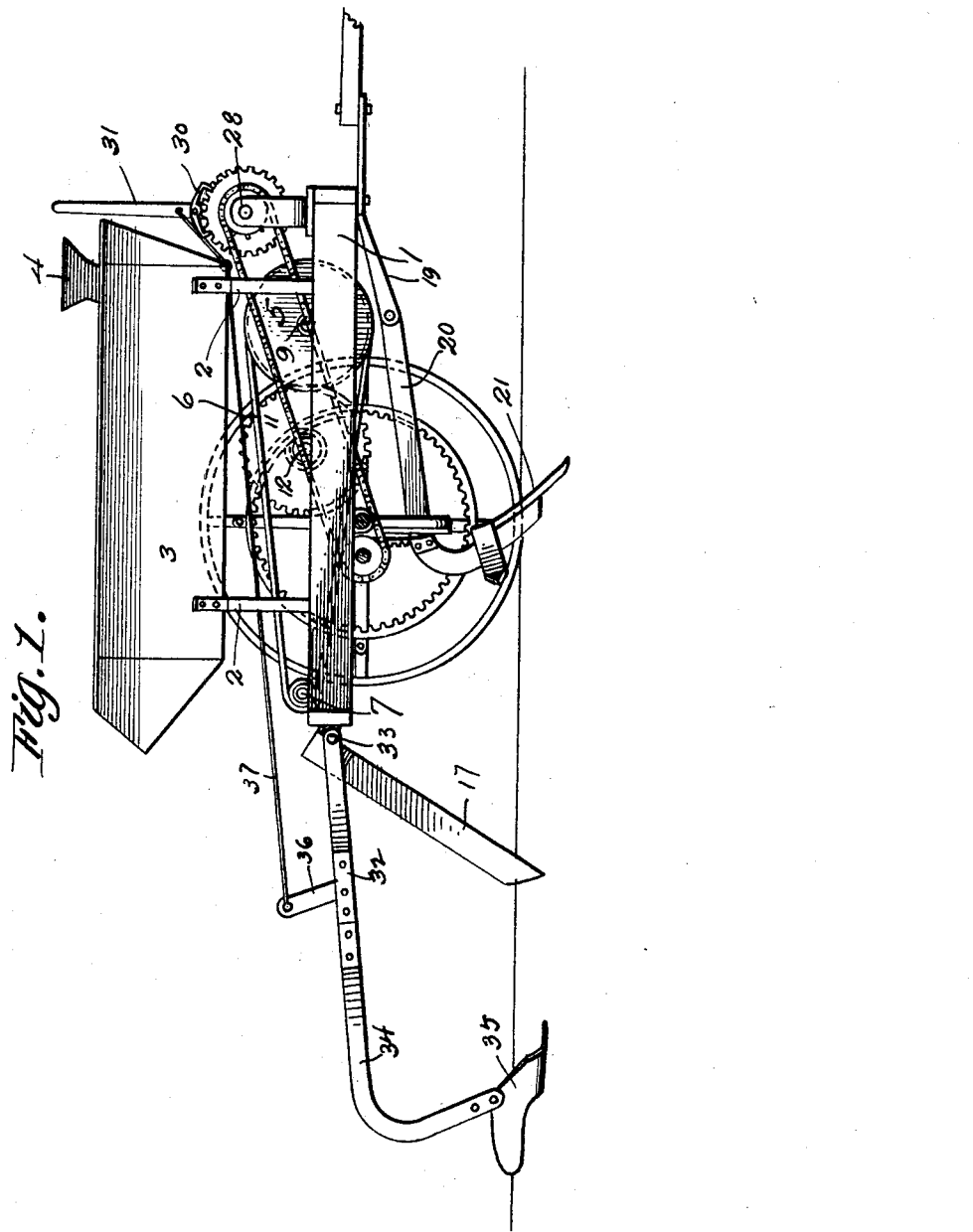

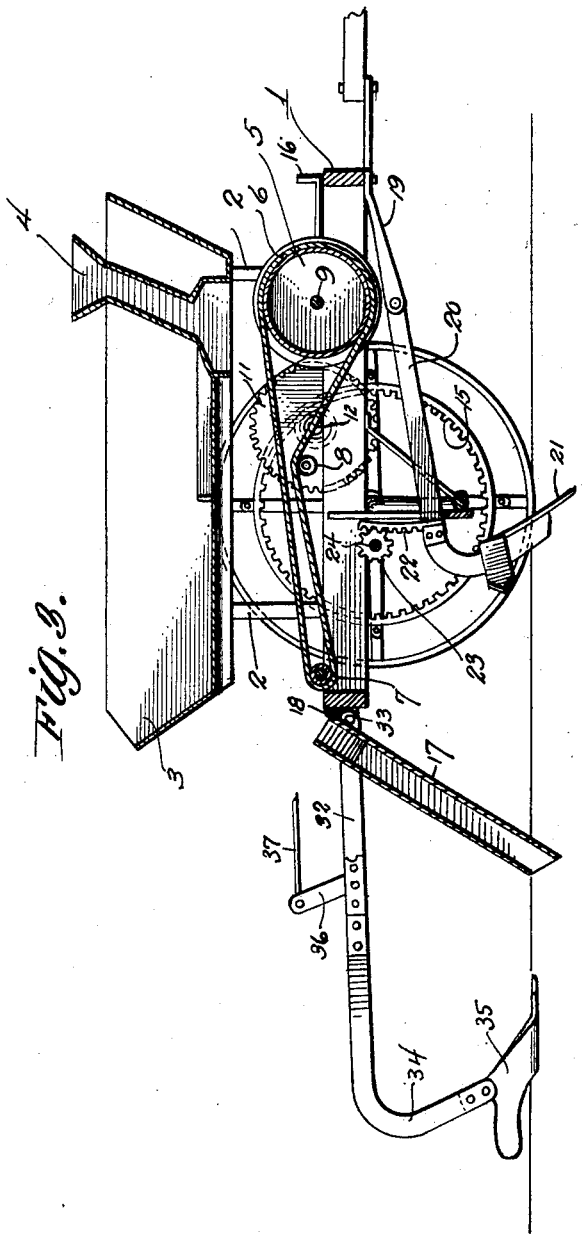

UNITED STATES PATENT OFFICE.

EDWARD H. HIPPLE, OF HONOLULU, TERRITORY OF HAWAII.

CANE-PLANTER.

1,386,407.  Specification of Letters Patent.  Patented Aug. 2, 1921.

Application filed June 25, 1919. Serial No. 306,605.

*To all whom it may concern:*

Be it known that I, EDWARD H. HIPPLE, a citizen of the Territory of Hawaii, residing at Honolulu, Territory of Hawaii, have invented certain new and useful Improvements in Cane-Planters, of which the following is a specification.

This invention relates to planting apparatus, and more particularly to a cane planter, the primary object being to provide an apparatus which will plow the ground and convey the seed cane into the plowed furrow in the proper manner so that it will be properly deposited in the furrow to be covered by the following earth turning element.

One of the objects of the invention is to provide an apparatus which will cause the seed cane to be properly fed by providing means for straightening out the seed shoots as they are conducted to the planting tube.

A further object of the invention is to provide a device of this character which consists of comparatively few parts, but is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a side elevation of the device constructed in accordance with my invention, Fig. 2 is a plan view of the same, Fig. 3 is a longitudinal section, Fig. 4 is a plan view of the receptacle mounted on the apparatus, Fig. 5 is a section taken on the line 5—5 of Fig. 4.

Referring to the drawings, wherein is illustrated the preferred form of my invention, in which like characters of reference indicate like or corresponding parts throughout the several views, the wheel supported frame 1 is provided with brackets 2 upon which the receptacle 3 is supported and the latter may be of any desired capacity and is substantially rectangular having sloping sides. A seed chute 4 is included in the receptacle structure and is designed so that the operator standing in the receptacle may feed the seeds through the chute 4. Disposed below the receptacle and directly beneath the chute 4 is a pulley or roller 5 over which a conveyer belt 6 is trained and this belt extends rearwardly and passes over a relatively small roller 7 carried at the rear of the frame. The belt is held taut by an idler 8 disposed approximately midway between the lower runner of the belt. The pulley or roller 5 is mounted upon a shaft 9 journaled in the frame and equipped with a gear 10 meshing with a gear 11 on the counter shaft 12 which is supported in bearings in the frame and which has its outer end equipped with a sliding clutch element 13, whereby the pinion 14 on the end of the counter shaft 12 may be engaged and disengaged as desired. Each wheel of the apparatus is equipped with an internal gear 15, the teeth of which mesh with the pinion 14 so that the counter shaft 12 is driven by the wheels when the clutch is in operative position. The clutch is controlled by the clutch lever 16 pivotally mounted on the frame and having one end disposed within convenient reach of the operator. In this manner, the belt pulley 5 may be driven to impart movement to the conveyer belt 6 and it will be noted that when the seed shoots are dropped through the conveyer chute 4, the seed shoots will be conducted rearwardly by virtue of the movement of the conveyer belt and be deposited over the rear of the frame. Attached to the rear of the frame is a planting tube 17, the upper end of which is enlarged and tapered to conveniently receive the seed shoots from the belt. The lower end is adapted to drag on the ground and the tube is therefore hingedly connected as indicated at 18 to the rear end of the frame.

Attached to the forward end of the frame is a link 19 pivotally connected to a plow beam 20 which carries the plow 21 for forming a furrow in the soil when the device is in motion. An arcuate rack bar 22 is secured to and projects upwardly from beam 20 and engages a pinion 23 mounted on an auxiliary shaft 24 which is equipped with a sprocket 25 having a chain 26 trained thereover. This chain projects forwardly and is engaged with a sprocket 27 on a shaft 28 which is equipped at one end with a ratchet gear 29 adapted to be engaged with a ratchet member 30 actuated by the operating lever 31 which is pivotally mounted on one end of the shaft 28. It will be noted that when the lever 31 is reciprocated the ratchet member will impart rotary movement to the gear which in turn will turn the shaft 28 and the shaft 24 will be turned by virtue of the sprocket and chain connection thus causing the pinion 23 to be actuated for raising and lowering the rack bar 22 and thus imparting the necessary movement to the plow beam whereby the depth of the plow 21 may be controlled.

The seed tube 17 being centrally located with respect to the center of the frame and the plow 21 will drag in the furrow made by the plow when the device is in operation.

Attached to the rear of the frame is the plow beam 32 which is pivotally mounted as indicated at 33 and the rear ends of the beam are separated to diverge rearwardly forming the angular arms 34 each of which carries a turning blade 35 for turning the soil back after being plowed by the forward plow 21, whereby the furrow will be covered. Obviously any preferred type of blade may be employed for this purpose. Attached to the beam 32 is an arm 36 connected with a cable 37 which projects forwardly and passes over a pulley 38 on the forward end of the receptacle 3. From this pulley the cable extends to the lever 31 so that when the lever is thrust forwardly the cable will be drawn to elevate the beam 32 whereby the member 35 will be raised out of engagement with the soil.

While the device is especially adapted for planting cane it may be employed in planting other seeds which require considerable depth when the seed is planted. Inasmuch as the seed tube is pivotally mounted it will be obvious that its lower end will drag in the bottom of the furrow formed by the plow 21, and inasmuch as the depth of the plow may be readily controlled it will be apparent that the device may be easily regulated to accommodate different species of seeds.

The foregoing description and accompanying drawings have reference to what might be considered to be the approved or preferred form of my invention. I desire it to be understood that I may make such changes in construction, combination and arrangement of parts, as may prove expedient and fall within the scope of the appended claim.

Having thus fully described my invention what I claim as new and desire to secure by Letters Patent, is:—

In a device provided with a furrow opener and furrow closer and a feed depositor between the opener and closer, a means for lifting the said members in coöperative relation comprising an arcuate rack mounted to the furrow opener and a pinion co-meshing with the rack, a chain driving the pinion for lowering and lifting the opener, a member operable of the chain interconnected with the furrow closer, a chute pivotally mounted in abutment to the furrow closer whereby upon the movement of the furrow closer the chute will also be moved.

In testimony whereof I affix my signature in presence of two witnesses.

EDWARD H. HIPPLE.

Witnesses:
FRANK ANDRADE,
CY CHOWE.